US005745077A

United States Patent [19]
Das

[11] Patent Number: 5,745,077
[45] Date of Patent: Apr. 28, 1998

[54] HIGH EFFICIENCY SATELLITE EQUALLY LOADED TRANSMITTING COMMUNICATION SYSTEM

[76] Inventor: Satyendranath Das, P.O. Box 574, Mt View, Calif. 94042-0574

[21] Appl. No.: 665,309

[22] Filed: Jun. 17, 1996

[51] Int. Cl.⁶ .................................................. H01Q 3/02
[52] U.S. Cl. ........................ 342/374; 342/368; 455/13.3
[58] Field of Search .................................. 342/354, 368, 342/374; 455/13.3

[56] References Cited

U.S. PATENT DOCUMENTS 4,907,004  3/1990  Zacharatos et al. ..................... 342/373

5,550,550  8/1996  Das ........................................ 342/353

Primary Examiner—Thomas H. Tarcza
Assistant Examiner—Dao L. Phan

[57] ABSTRACT

A design of equally loaded, under varying traffic load conditions, power amplifiers for a multibeam satellite is presented. Each output beam contains signals of only one beam corresponding to its input beam. The output beams are shaped to produce a small reduction of power at the crossover point of adjacent beams. MMIC and high Tc superconducting designs, including the design of high Tc superconducting reflector antenna, are presented.

20 Claims, 2 Drawing Sheets

HIGH EFFICIENCY SATELLITE EQUALLY LOADED TRANSMITTING COMMUNICATION SYSTEM

FIELD OF INVENTION

1. The present invention relates to a satellite transmitting system.

2. In satellite communications, it is sometimes necessary to transmit using multiple beams.

DESCRIPTION OF PRIOR ART

Das discussed satellite multibeam antennas. S. Das, "Multibeam Antennas Improve Satellite Cummunications", pp. 42–55, MSN, December 1977. "An Adaptive Multiple Beam System Concept", IEEE Journal of Selected Areas in Communications, vol. SAC-4, No.5, p. 630, 1987 has been discussed. U.S. Pat. Nos. 4,907,004 and 4,232,266 are related to this invention. Application 08/511,532 and a second one have been filed.

SUMMARY OF THE INVENTION

The purpose of the present invention is to keep the different transmitters of a satellite equally loaded during dynamic traffic conditions and thus to minimise the prime power requirements of the satellite.

This kind of multiple beam transmitters can be used in INTELSAT, INMARSAT, domestic satellites, broadcasting satellites, mobile satellites, personal communications satellites and other satellites where traffic load varies dynamically. For communication in many European countries, a small number of beams are required. For countries like China, Canada, some countries of South America and U.S.A, a moderate number of beams are required. For coverage of ocean areas by INMARSAT a larger number of beams are required.

Each input beam is fed to a switched terminal of an input switch (ISW). The fixed terminal of the input switch is connected to the fixed terminal of a second switch which is connected to the input of the power amplifiers (SWAI). Each switched terminal of the SWAI is connected to the input of a power amplifier (PA). The output of each power amplifier is connected to a switched terminal of a switch (SWAO). The fixed terminal of the SWAO is connected to the fixed terminal of a switch (SWF) which is connected to the feed elements. Each switched terminal of the SWF is connected to a feed element. One input beam is switched by the ISW to the input of one PA and the output of each PA is switched by the SWAO to the corresponding output feed element. The output signal of each power amplifier is added in space. The switches are switched synchronously by a microprocessor.

Another objective of this invention is to implement a portion or the entire system in a monolithic microwave integrated circuit (MMIC) technology. Another objective of this invention is to use a conductive deposition of a film of single crystal high Tc superconductor, such as YBCO, TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another objective is to build very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million, for high Tc superconducting microwave devices, has been demonstrated. G. Shen, C. Wilker, P. Pang and W. C. Holstein, "High Tc Superconducting-sapphire Microwave resonator with Extremely High Q-Values up To 90K," IEEE MTT-S, Digest, pp. 193–196, 1992. U.S. Pat. Nos. 5,407,904 and 5,407,905 have been issued on high Tc superconducting microwave devices.

Table I shows a comparison of the previous application and the present invention.

TABLE I

| BEAM | CHARACTERISTIC | PREVIOUS APPLICATION | THIS APPLICATION |
|---|---|---|---|
| 4 | PD | 4 | NONE |
|  | SW | 8 | 4 |
|  | LINES | 32 | NONE |
| 16 | PD | 16 | NONE |
|  | SW | 32 | 4 |
|  | LINES | 512 | NONE |

The differences in the 16 beam case are discussed. In the previous application 16 power dividers were required. In this application no power divider is required. In the previous application 512 connecting lines were required. In this application no connecting line is required. In the previous application 32 switches were required. In the present application 4 switches are required.

With these and other objectives in view, as will be more particularly pointed out in detail in the appended claims, reference is now made to the following description taken in connection with accompanying diagrams.

DETAILED DESCRIPTION OF THE PREFERRED EMBODIMENT

Figure 1:
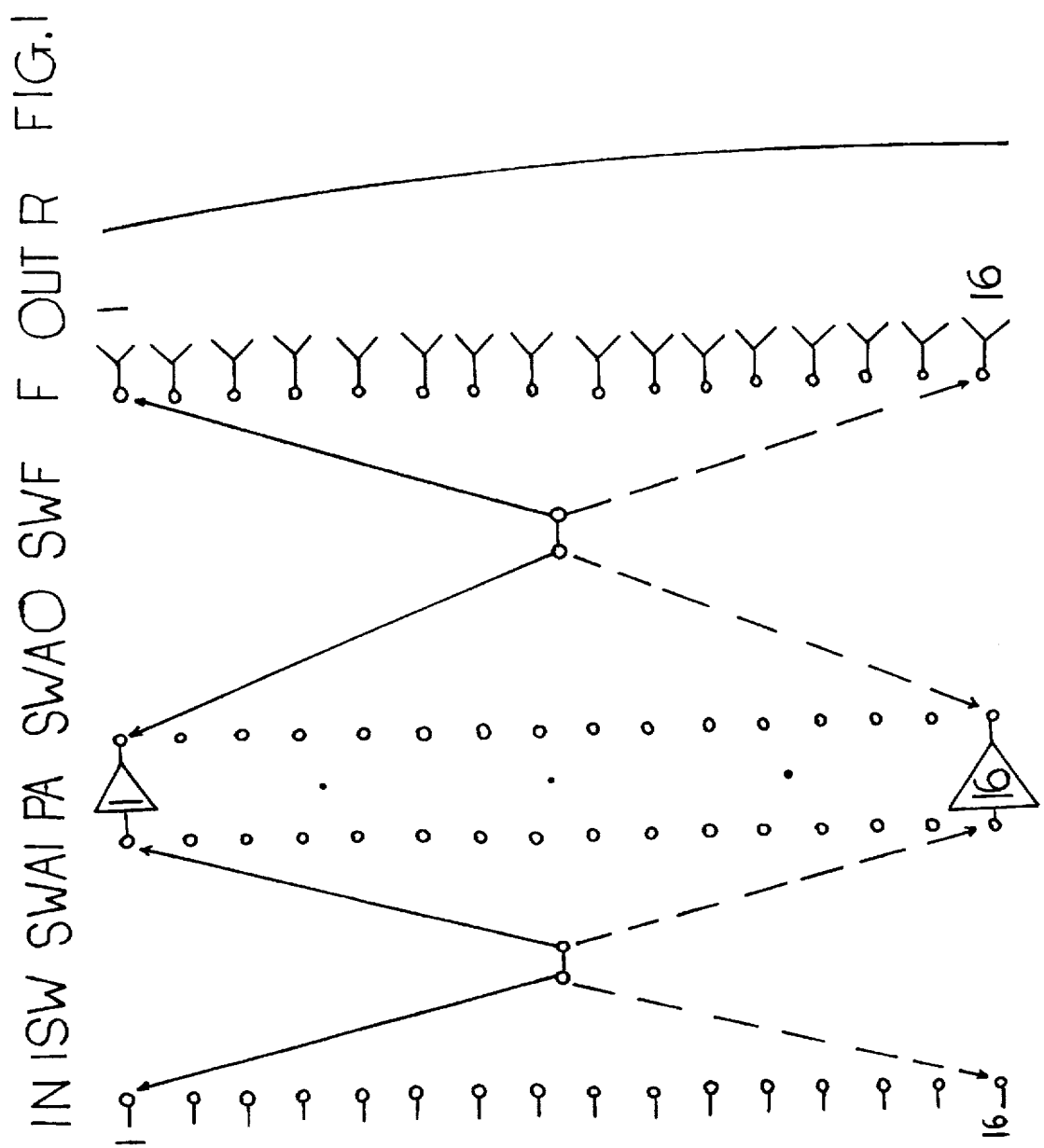
FIG. 1 depicts a 16-beam embodiment of the present invention.

FIG. 1 shows a 16-beam embodiment of my invention. FIG. 1 depicts 16 input (IN) beams. There is an input switch (ISW). The ISW has 16 switched terminals and 1 fixed terminal. IN1, 1st input from the top, is connected to the 1st, from the top, switched terminal of the ISW. IN2, 2nd input from the top, is connected to the 2nd, from the top, switched terminal of the ISW. IN3, 3rd input from the top, is connected to the 3rd, from the top, switched terminal of the ISW. IN4, 4th input from the top, is connected to the 4th, from the top, switched terminal of the ISW. IN5, 5th input from the top, is connected to the 5th, from the top, switched terminal of the ISW. IN6, 6th input from the top, is connected to the 6th, from the top, switched terminal of the ISW. IN6, 6th input from the top, is connected to the 6th, from the top, switched terminal of the ISW. IN7, 7th input from the top, is connected to the 7th, from the top, switched terminal of the ISW. IN8, 8th input from the top, is connected to the 8th, from the top, switched terminal of the ISW. IN9, 9th input from the top, is connected to the 9th, from the top, switched terminal of the ISW. IN10, 10th input from the top, is connected to the 10th, from the top, switched terminal of the ISW. IN11, 11th input from the top, is connected to the 11th, from the top, switched terminal of the ISW. IN12, 12th input from the top, is connected to the 12th, from the top, switched terminal of the ISW. IN13, 13th input from the top, is connected to the 13th, from the top, switched terminal of the ISW. IN14, 14th input from the top, is connected to the 14th, from the top, switched terminal of the ISW. IN15, 15th input from the top, is connected to the 15th, from the top, switched terminal of the ISW. IN16, 16th input from the top, is connected to the 16th, from the top, switched terminal of the ISW.

The fixed terminal of the ISW is connected to the fixed terminal of a second switch whose switched terminals are connected to the input of the power amplifiers. This latter is a switch to the amplifier input (SWAI).

The first, from the top, switched terminal of the SWAI is connected to the input of the PA1. The second, from the top, switched terminal of the SWAI is connected to the input of the PA2. The third, from the top, switched terminal of the SWAI is connected to the input of the PA3. The fourth, from the top, switched terminal of the SWAI is connected to the input of the PA4. The fifth, from the top, switched terminal of the SWAI is connected to the input of the PA5. The sixth, from the top, switched terminal of the SWAI is connected to the input of the PA6. The seventh, from the top, switched terminal of the SWAI is connected to the input of the PA7. The eighth, from the top, switched terminal of the SWAI is connected to the input of the PA8. The ninth, from the top, switched terminal of the SWAI is connected to the input of the PA9. The tenth, from the top, switched terminal of the SWAI is connected to the input of the PA10. The 11th, from the top, switched terminal of the SWAI is connected to the input of the PA11. The 12th, from the top, switched terminal of the SWAI is connected to the input of the PA12. The 13th, from the top, switched terminal of the SWAI is connected to the input of the PA13. The 14th, from the top, switched terminal of the SWAI is connected to the input of the PA14. The 15th, from the top, switched terminal of the SWAI is connected to the input of the PA15. The 16th, from the top, switched terminal of the SWAI is connected to the input of the PA16.

The first, from the top, switched terminal of the switch at the amplifier output, SWAO, is connected to the output of the PA1. The second, from the top, switched terminal of the SWAO is connected to the output of the PA3. The third, from the top, switched terminal of the SWAO is connected to the output of the PA3. The fourth, from the top, switched terminal of the SWAO is connected to the output of the PA4. The fifth, from the top, switched terminal of the SWAO is connected to the output of the PA5. The sixth, from the top, switched terminal of the SWAO is connected to the output of the PA6. The seventh, from the top, switched terminal of the SWAO is connected to the output of the PA7. The eighth, from the top, switched terminal of the SWAO is connected to the input of the PA8. The ninth, from the top, switched terminal of the SWAI is connected to the output of the PA9. The tenth, from the top, switched terminal of the SWAO is connected to the output of the PA10. The 11th, from the top, switched terminal of the SWAO is connected to the output of the PA11. The 12th, from the top, switched terminal of the SWAO is connected to the output of the PA12. The 13th, from the top, switched terminal of the SWAO is connected to the output of the PA13. The 14th, from the top, switched terminal of the SWAO is connected to the output of the PA14. The 15th, from the top, switched terminal of the SWAO is connected to the output of the PA15. The 16th, from the top, switched terminal of the SWAO is connected to the output of the PA16.

The fixed terminal of the SWAO is connected to the fixed terminal of a fourth switch whose switched terminals are connected to the feeds (F). The latter switch is connected to the feeds (SWF).

The first, from the top, switched terminal of the SWF is connected to the output beam (OUT) 1. The 2nd, from the top, switched terminal of the SWF is connected to the OUT 2. The 3rd, from the top, switched terminal of the SWF is connected to the OUT 3. The 4th, from the top, switched terminal of the SWF is connected to the OUT 4. The 5th, from the top, switched terminal of the SWF is connected to the OUT 5. The 6th, from the top, switched terminal of the SWF is connected to the OUT 6. The 7th, from the top, switched terminal of the SWF is connected to the OUT 7. The 8th, from the top, switched terminal of the SWF is connected to the OUT 8. The 9th, from the top, switched terminal of the SWF is connected to the OUT 9. The 10th, from the top, switched terminal of the SWF is connected to the OUT 10. The 11th, from the top, switched terminal of the SWF is connected to the OUT 11. The 12th, from the top, switched terminal of the SWF is connected to the OUT 12. The 13th, from the top, switched terminal of the SWF is connected to the OUT 13. The 14th, from the top, switched terminal of the SWF is connected to the OUT 14. The 15th, from the top, switched terminal of the SWF is connected to the OUT 15. The 16th, from the top, switched terminal of the SWF is connected to the OUT 16.

The ISW and the SWF are switched at the Nyquist rate. At one time the ISW is connected to the IN1 and the SWF is connected to the OUT1. The SWAI is switched from PA1 successively through to PA16. The SWAO is switched, at the same time synchronously with SWAI, from PA1 successively through to PA16. As a result IN1 is amplified, one after another, successively from PA1 through to PA16 and transmitted to OUT1. The transmitted outputs of PA1 through PA16, are combined in space. The SWAI and SWAO are switched at a rate n, where n is the number of input beams, times faster than the ISW and the SWF.

Next, the ISW is connected to the IN2 and the SWF is connected to the OUT2. The SWAI is switched from PA1 successively through to PA16. The SWAO is switched, at the same time synchronously with SWAI, from PA1 successively through to PA16. As a result IN2 is amplified, one after another, successively from PA1 through to PA16 and transmitted to OUT2. The transmitted outputs of PA1 through PA16, are combined in space.

Next, the ISW is connected to the IN3 and the SWF is connected to the OUT3. The SWAI is switched from PA1 successively through to PA16. The SWAO is switched, at the same time synchronously with SWAI, from PA1 successively through to PA16. As a result IN3 is amplified, one after another, successively from PA1 through to PA16 and transmitted to OUT3. The transmitted outputs of PA1 through PA16, are combined in space.

Next, the ISW is connected to the IN4 and the SWF is connected to the OUT4. The SWAI is switched from PA1 successively through to PA16. The SWAO is switched, at the same time synchronously with SWAI, from PA1 successively through to PA16. As a result IN4 is amplified, one after another, successively from PA1 through to PA16 and transmitted to OUT4. The transmitted outputs of PA1 through PA16, are combined in space.

Next, the ISW is connected to the IN5 and the SWF is connected to the OUT 5. The SWAI is switched from PA1 successively through to PA16. The SWAO is switched, at the same time synchronously with SWAI, from PA1 successively through to PA16. As a result IN5 is amplified, one after another, successively from PA1 through to PA16 and transmitted to OUT5. The transmitted outputs of PA1 through PA16, are combined in space.

Next, the ISW is connected to the IN6 and the SWF is connected to the OUT6. The SWAI is switched from PA1 successively through to PA16. The SWAO is switched, at the same time synchronously with SWAI, from PA1 successively through to PA16. As a result IN6 is amplified, one after another, successively from PA1 through to PA16 and transmitted to OUT6. The transmitted outputs of PA1 through PA16, are combined in space.

Next, the ISW is connected to the IN7 and the SWF is connected to the OUT7. The SWAI is switched from PA1 successively through to PA16. The SWAO is switched, at the same time synchronously with SWAI, from PA1 successively through to PA16. As a result IN7 is amplified, one after another, successively from PA1 through to PA16 and transmitted to OUT7. The transmitted outputs of PA1 through PA16, are combined in space.

Next, the ISW is connected to the IN8 and the SWF is connected to the OUT8. The SWAI is switched from PA1 successively through to PA16. The SWAO is switched, at the same time synchronously with SWAI, from PA1 successively through to PA16. As a result IN8 is amplified, one after another, successively from PA1 through to PA16 and transmitted to OUT8. The transmitted outputs of PA1 through PA16, are combined in space.

Next, the ISW is connected to the IN9 and the SWF is connected to the OUT9. The SWAI is switched from PA1 successively through to PA16. The SWAO is switched, at the same time synchronously with SWAI, from PA1 successively through to PA16. As a result IN9 is amplified, one after another, successively from PA1 through to PA16 and transmitted to OUT9. The transmitted outputs of PA1 through PA16, are combined in space.

Next, the ISW is connected to the IN10 and the SWF is connected to the OUT10. The SWAI is switched from PA1 successively through to PA16 The SWAO is switched, at the same time synchronously with SWAI, from PA1 successively through to PA16. As a result IN10 is amplified, one after another, successively from PA1 through to PA16 and transmitted to OUT10. The transmitted outputs of PA1 through PA16, are combined in space.

Next, the ISW is connected to the IN11 and the SWF is connected to the OUT11. The SWAI is switched from PA1 successively through to PA16. The SWAO is switched, at the same time synchronously with SWAI, from PA1 successively through to PA16. As a result IN11 is amplified, one after another, successively from PA1 through to PA16 and transmitted to OUT11. The transmitted outputs of PA1 through PA16, are combined in space.

Next, the ISW is connected to the IN12 and the SWF is connected to the OUT12. The SWAI is switched from PA1 successively through to PA16. The SWAO is switched, at the same time synchronously with SWAI, from PA1 successively through to PA16. As a result IN12 is amplified, one after another, successively from PA1 through to PA16 and transmitted to OUT12. The transmitted outputs of PA1 through PA16, are combined in space.

Next, the ISW is connected to the IN13 and the SWF is connected to the OUT13. The SWAI is switched from PA1 successively through to PA16. The SWAO is switched, at the same time synchronously with SWAI, from PA1 successively through to PA16. As a result IN13 is amplified, one after another, successively from PA1 through to PA16 and transmitted to OUT13. The transmitted outputs of PA1 through PA16, are combined in space.

Next, the ISW is connected to the IN14 and the SWF is connected to the OUT14. The SWAI is switched from PA1 successively through to PA16. The SWAO is switched, at the same time synchronously with SWAI, from PA1 successively through to PA16. As a result IN14 is amplified, one after another, successively from PA1 through to PA16 and transmitted to OUT14. The transmitted outputs of PA1 through PA16, are combined in space.

Next, the ISW is connected to the IN15 and the SWF is connected to the OUT15. The SWAI is switched from PA1 successively through to PA16. The SWAO is switched, at the same time synchronously with SWAI, from PA1 successively through to PA16. As a result IN15 is amplified, one after another, successively from PA1 through to PA16 and transmitted to OUT15. The transmitted outputs of PA1 through PA16, are combined in space.

The process is repeated by connecting ISW to IN16 and SWF to OUT16 and so on.

For a 61-beam system, like the Odyssey, 4 sets of 16 beam design can be made. First set will contain 1st through 16th input beams, 1st through 16th PA's and 1st through 16th output beams. The second set will contain 17th through 32nd input beams, 17th through 32nd PA's and 17th through 32nd output beams. Third set will contain 33rd through 48th input beams, 33rd through 48th PA's and 33rd through 48th output beams. The fourth set will contain 49th through 61st input beams, 49th through 61st PA's and 49th through 61st output beams. Altogether 16 switches will be required. This design provides a tremendous prime power and, consequently, weight saving for the satellite. For the Odyssey example, 8 sets of a 8 beam arrangement can be made. Some other set of a multi-beam design can be selected depending on the requirements. A trade-off study, in any individual case, will provide the optimum design of the transmitting system to meet a set of requirements.

Figure 2:
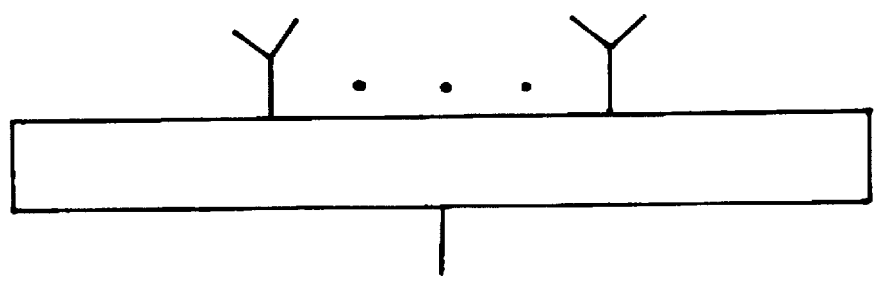
FIG. 2 depicts an arrangement to provide 1 through m feed elements for each output beam.

With one feed element per beam, there will be a considerable amount of loss of power at the crossover point between the adjacent beams. To reduce the loss of power at the crossover point between the adjacent beams, the output beam signal can be fed to a power divider (PD) as shown in FIG. 2. The output of the power divider can be fed to 2 .. . m feed elements depending on the beam shaping and the consequent loss of power desired at the crossover point between the adjacent beams. The feed elements are placed at or near the focal plane of the reflector antenna (R).

In another embodiment of this invention is a portion or the entire system is implemented in a monolithic microwave integrated circuit (MMIC) technology. Another objective of this invention is to use a conductive deposition of a film of single crystal high Tc superconductor, such as YBCO, TBCCO, for a portion or the entire system and operate the system at a high superconducting temperature, currently between 75 and 105 degrees Kelvin, and thus reduce the conductive losses of the system. U.S. Pat. No. 5,409,889 includes a MMIC high Tc superconducting microwave device.

Another embodiment is a very low conductive loss high Tc superconductive waveguide multibeam transmitters. All the components, in the waveguide embodiment, are made of a single crystal high Tc superconductor such as YBCO, TBCCO. The waveguide feed elements and the reflector antenna are also made of a single crystal high Tc superconductor including YBCO, TBCCO. In another waveguide embodiment, all the components, including waveguide feed elements are made of a single crystal dielectric material, such as sapphire, lanthanum aluminate, having interior surfaces which are deposited with a film of a single crystal high Tc superconductor such as YBCO, TBCCO. The reflector antenna is also made of a single crystal dielectric material such as sapphire, lanthanum aluminate, having reflecting surfaces which are deposited with a film of a single crystal high Tc superconductor. The high Tc superconducting transmitters are operated at a high superconducting temperature currently above 77 degrees K. A Q of one million , for high Tc superconducting microwave devices, has been demonstrated. G. Shen, C. Wilker, P. Pang and W. C. Holstein, "High Tc Superconducting-sapphire Microwave resonator with Extremely High Q-Values up To 90K," IEEE MTT-S, Digest, pp. 193-196, 1992. U.S. Pat. Nos. 5,407,904 and 5,407,905 have been issued on high Tc superconducting microwave devices.

It should be understood that the foregoing disclosure relates to only typical embodiments of this invention and that numerous modifications or alternatives may be made therein, by those of ordinary skill, without departing from the spirit and scope of this invention as set forth in the appended claims. The invention includes different number of beams, all RF, microwave and millimeter wave frequencies, all waveguide embodiments, coaxial embodiments, microstrip embodiments, MMIC embodiments, use of multilayer boards, combination of waveguide, coaxial, microstrip, different types of microprocessors, different types of feed elements, different types of single crystal dielectric materials, different types of high Tc single crystal superconducting materials, different types of switches including semiconductor, ferrite and ferroelectric switches.

What is claimed is:

1. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor and comprised of;

input beams 1 through n;

four switches:

a first of said four switches having a number of switched terminals equal to the number of input beams;

a first switched terminal of said first switch being connected to said first input beam;

a second switched terminal of said first switch being connected to said second input beam;

each third through nth switched terminal of said first switch being connected to each said third through nth input beam respectively;

a second of said four switches having a number of switched terminals equal to the number of input beams;

power amplifiers 1 through n;

a first switched terminal of said second switch being connected to the input of said power amplifier 1;

a second switched terminal of said second switch being connected to the input of said power amplifier 2;

each third through nth switched terminal of said second switch being connected to the input of each said third through nth power amplifier respectively;

the fixed terminal of the first switch being connected to the fixed terminal of the second switch;

a third of said four switches having a number of switched terminals equal to the number of input beams;

a first switched terminal of said third switch being connected to the output of said power amplifier 1;

a second switched terminal of said third switch being connected to the output of said power amplifier 2;

each third through nth switched terminal of said third switch being connected to the output of each said third through nth power amplifier respectively;

a fourth of said four switches having a number of switched terminals equal to the number of input beams;

a first switched terminal of said fourth switch being connected to the first feed element;

a second switched terminal of said fourth switch being connected to the second feed element;

each third through nth switched terminal of said fourth switch being connected to each said third through nth feed element respectively;

the fixed terminal of the third switch being connected to the fixed terminal of the fourth switch;

a reflector antenna;

output beams 1 through n respectively;

feed elements 1 through n, for said output beams, being located at or near the focal plane of said reflector antenna, forming each output beam;

said first and fourth switches being switched synchronously at a Nyquist rate by a microprocessor;

said second and third switches being switched synchronously at a rate n times faster than the rate at which said first and fourth switches being switched;

for each switched position of said first and fourth switches, said second and third switches being switched synchronously from 1 through n switched terminals respectively by a microprocessor; and said input beams, said first switch, said second switch, said power amplifiers, said third switch, said fourth switch, and said feed elements being connected together to produce each single output beam corresponding to each one input beam.

2. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 1;

wherein said multibeam transmitters being comprised of waveguides.

3. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 2 wherein the waveguides of said multibeam transmitters being comprised of a high Tc single crystal high Tc superconductor;

said feed elements being comprised of a single crystal high Tc superconductor; and said multibeam transmitters being operated at a high superconducting temperature.

4. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 2 wherein the waveguides of said multibeam transmitters being comprised of a single crystal dielectric material having interior surfaces which are deposited with a film of a single crystal high Tc superconductor;

said feed elements being comprised of a single crystal dielectric material having inner surfaces which being deposited with a film of a single crystal high Tc superconductor; and said multibeam transmitters being operated at a high superconducting temperature.

5. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 3;

wherein said reflector antenna being comprised of a single crystal high Tc superconductor having a Q of 1 million at microwave frequencies.

6. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 5;

wherein the single crystal high Tc superconductor being YBCO.

7. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 5;

wherein the single crystal high Tc superconductor material being TBCCO.

8. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 4;

wherein said reflector antenna being comprised of a single crystal dielectric material having reflecting surfaces which being deposited with a film of a single crystal high Tc superconductor having a Q of 1 million.

9. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 8;

wherein the single crystal dielectric material being sapphire.

10. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 9;

wherein the single crystal high Tc superconductor being YBCO.

11. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 9;

wherein the single crystal high Tc superconductor material being TBCCO.

12. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 8;

wherein the single crystal dielectric material being lanthanum aluminate.

13. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 12;

wherein the single crystal high Tc superconductor being YBCO.

14. An efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 12;

wherein the single crystal high Tc superconductor being TBCCO.

15. A monolithic, efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor and comprising;

input beams 1 through n;

four switches:

a first of said four switches having a number of switched terminals equal to the number of input beams;

a first switched terminal of said first switch being connected to said first input beam;

a second switched terminal of said first switch being connected to said second input beam;

each third through nth switched terminal of said first switch being connected to each said third through nth input beam respectively;

a second of said four switches having a number of switched terminals equal to the number of input beams;

power amplifiers 1 through n;

a first switched terminal of said second switch being connected to the input of said power amplifier 1;

a second switched terminal of said second switch being connected to the input of said power amplifier 2;

each third through nth switched terminal of said second switch being connected to the input of each said third through nth power amplifier respectively;

the fixed terminal of the first switch being connected to the fixed terminal of the second switch;

a third of said four switches having a number of switched terminals equal to the number of input beams;

a first switched terminal of said third switch being connected to the output of said power amplifier 1;

a second switched terminal of said third switch being connected to the output of said power amplifier 2;

each third through nth switched terminal of said third switch being connected to the output of each said third through nth power amplifier respectively;

a fourth of said four switches having a number of switched terminals equal to the number of input beams;

a first switched terminal of said fourth switch being connected to the first feed element;

a second switched terminal of said fourth switch being connected to the second feed element;

each third through nth switched terminal of said fourth switch being connected to each said third through nth feed element respectively;

the fixed terminal of the third switch being connected to the fixed terminal of the fourth switch;

a reflector antenna;

output beams 1 through n respectively;

feed elements 1 through n, for said output beams, being located at or near the focal plane of said reflector antenna, forming each output beam;

said first and fourth switches being switched synchronously at a Nyquist rate by a microprocessor;

said second and third switches being switched synchronously at a rate n times faster than the rate at which said first and fourth switches being switched; for each switched position of said first and fourth switches, said second and third switches being switched synchronously from 1 through n switched terminals respectively by a microprocessor;

said input beams, said first switch, said second switch, said power amplifiers, said third switch, said fourth switch, and said feed elements being connected together to produce each single output beam corresponding to each one input beam; and said first switch, said second switch, power amplifiers, said third switch and said fourth switch and said feed elements being MMIC.

16. A monolithic, efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 15;

wherein the conducting depositions of said microstrip lines being comprised of a film of a single crystal high Tc superconductor; and said multibeam transmitters being operated at a high superconducting temperature.

17. A monolithic, efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 16;

wherein the single crystal high Tc superconductor being YBCO.

18. A monolithic, efficient satellite multibeam equally loaded transmitting communication system containing input beams, an input switch connected to input beams, a switch connected to the input of each power amplifier, power amplifiers, a switch connected to the output of each power amplifier, feed elements, a switch connecting to each feed element, a reflector antenna, output beams, a microprocessor of claim 16;

wherein the single crystal high Tc superconductor being TBCCO.

19. An efficient satellite multibeam equally loaded transmitting communication system containing input beams, an input switch connected to input beams, a switch connected to the input of each power amplifier, power amplifiers, a switch connected to the output of each power amplifier, feed elements, power dividers, a switch connecting to each power divider, a reflector antenna, output beams, a microprocessor and comprising:

input beams 1 through n;

four switches:

a first of said four switches having a number of switched terminals equal to the number of input beams;

a first switched terminal of said first switch being connected to said first input beam;

a second switched terminal of said first switch being connected to said second input beam;

each third through nth switched terminal of said first switch being connected to each said third through nth input beam respectively;

a second of said four switches having a number of switched terminals equal to the number of input beams;

power amplifiers 1 through n;

a first switched terminal of said second switch being connected to the input of said power amplifier 1;

a second switched terminal of said second switch being connected to the input of said power amplifier 2;

each third through nth switched terminal of said second switch being connected to the input of each said third through nth power amplifier respectively;

the fixed terminal of the first switch being connected to the fixed terminal of the second switch;

a third of said four switches having a number of switched terminals equal to the number of input beams;

a first switched terminal of said third switch being connected to the output of said power amplifier 1;

a second switched terminal of said third switch being connected to the output of said power amplifier 2;

each third through nth switched terminal of said third switch being connected to the output of each said third through nth power amplifier respectively;

a fourth of said four switches having a number of switched terminals equal to the number of input beams;

1 through n output power dividers;

a first switched terminal of said fourth switch being connected to said first output power divider;

a second switched terminal of said fourth switch being connected to said second output power divider;

each third through nth switched terminal of said fourth switch being connected to each said third through nth output power divider respectively;

mxn feed elements;

each said 1 through n output power dividers being connected to 1 through m feed elements for shaping each output beam;

the fixed terminal of the third switch being connected to the fixed terminal of the fourth switch;

a reflector antenna;

output beams 1 through n respectively;

feed elements 1 through mxn, for said output beams, located at or near the focal plane of said reflector antenna, forming each output beam; said first and fourth switches being switched synchronously at a Nyquist rate by a microprocessor;

said second and third switches being switched synchronously at a rate n times faster than the rate at which said first and fourth switches being switched;

for each switched position of said first and fourth switches, said second and third switches being switched synchronously from 1 through n switched terminals respectively by a microprocessor; and said input beams, said first switch, said second switch, said power amplifiers, said third switch, said fourth switch, output power dividers and said feed elements being connected together to produce each single output beam corresponding to each one input beam respectively.

20. A monolithic, efficient satellite multibeam equally loaded transmitting communication system containing input beams, an input switch connected to input beams, a switch connected to the input of each power amplifier, power amplifiers, a switch connected to the output of each power amplifier, feed elements, power dividers, a switch connecting to each power divider, a reflector antenna, output beams, a microprocessor of claim 19;

wherein parts of the satellite multibeam transmitting communication system being MMIC.

* * * * *